(12) United States Patent
Petersson et al.

(10) Patent No.: US 8,938,372 B1
(45) Date of Patent: Jan. 20, 2015

(54) SIMULATING SIGNAL INTEGRITY STRUCTURES

(75) Inventors: Lars Eric Rickard Petersson, Harrisburg, PA (US); J. Eric Bracken, Harrison City, PA (US); John Bosley Manges, Pittsburgh, PA (US)

(73) Assignee: SAS IP, Inc., Cheyenne, WY (US)

( * ) Notice: Subject to any disclaimer, the term of this patent is extended or adjusted under 35 U.S.C. 154(b) by 971 days.

(21) Appl. No.: 12/878,494

(22) Filed: Sep. 9, 2010

(51) Int. Cl.
*G06F 17/16* (2006.01)
*H04B 3/00* (2006.01)

(52) U.S. Cl.
CPC .................................... *H04B 3/00* (2013.01)
USPC .......................................................... 703/2

(58) Field of Classification Search
None
See application file for complete search history.

(56) References Cited

U.S. PATENT DOCUMENTS

| | | | | |
|---|---|---|---|---|
| 4,303,892 | A * | 12/1981 | Weller et al. ................... | 330/286 |
| 5,313,398 | A * | 5/1994 | Rohrer et al. ................... | 703/14 |
| 5,553,097 | A | 9/1996 | Dagher | |
| 5,946,482 | A * | 8/1999 | Barford et al. .................. | 703/14 |
| 6,226,330 | B1 * | 5/2001 | Mansur ........................ | 375/257 |
| 6,349,272 | B1 | 2/2002 | Phillips | |
| 6,675,137 | B1 | 1/2004 | Toprac et al. | |
| 6,785,625 | B1 * | 8/2004 | Fan et al. ...................... | 702/117 |
| 6,832,170 | B2 * | 12/2004 | Martens ......................... | 702/65 |
| 6,961,669 | B2 * | 11/2005 | Brunsman ..................... | 702/117 |
| 7,034,548 | B2 * | 4/2006 | Anderson ..................... | 324/600 |
| 7,127,363 | B2 * | 10/2006 | Loyer ............................. | 702/57 |
| 7,149,666 | B2 * | 12/2006 | Tsang et al. ..................... | 703/2 |
| 7,389,191 | B2 * | 6/2008 | Furuya et al. .................. | 702/65 |
| 7,539,961 | B2 * | 5/2009 | Dengi et al. .................. | 716/109 |
| 7,627,028 | B1 * | 12/2009 | Frei et al. ...................... | 375/224 |
| 7,865,319 | B1 * | 1/2011 | Jacobs et al. .................... | 702/57 |
| 8,063,713 | B2 * | 11/2011 | Cheng et al. ...................... | 333/4 |
| 8,245,165 | B1 | 8/2012 | Tiwary et al. | |
| 8,386,216 | B1 * | 2/2013 | Al-Hawari et al. ............... | 703/2 |
| 2003/0109995 | A1 * | 6/2003 | Mabuchi et al. ................ | 702/64 |
| 2003/0208327 | A1 * | 11/2003 | Martens ......................... | 702/65 |
| 2007/0038428 | A1 * | 2/2007 | Chen .............................. | 703/14 |
| 2007/0073499 | A1 * | 3/2007 | Sawyer et al. .................. | 702/75 |
| 2008/0120083 | A1 * | 5/2008 | Dengi et al. ................... | 703/14 |
| 2008/0120084 | A1 * | 5/2008 | Dengi et al. ................... | 703/14 |
| 2009/0184879 | A1 * | 7/2009 | Derneryd et al. ............. | 343/853 |
| 2009/0284431 | A1 * | 11/2009 | Meharry et al. .............. | 343/816 |
| 2009/0314051 | A1 * | 12/2009 | Khutko et al. ................. | 73/1.01 |
| 2010/0318833 | A1 * | 12/2010 | Reichel et al. ..................... | 714/2 |
| 2011/0010410 | A1 | 1/2011 | DeLaquil et al. | |
| 2011/0218789 | A1 | 9/2011 | Van Beurden | |
| 2011/0286506 | A1 * | 11/2011 | Libby et al. ................... | 375/224 |
| 2012/0326737 | A1 * | 12/2012 | Wen ......................... | 324/750.01 |

OTHER PUBLICATIONS

S. Shin et al "Analytical Models and algorithms for the Efficient Signal integrity Verification of Inductance-Effect-Prominent Multicoupled VLSI Circuit Interconnects" pp. 395-407, Apr. 2004.*
Anderson et al "Full-Wave Analysis in SPICE via Model-Order Reduction" pp. 2314-2320, IEEE 2004.*

(Continued)

*Primary Examiner* — Omar Fernandez Rivas
*Assistant Examiner* — Kibrom K Gebresilassie
(74) *Attorney, Agent, or Firm* — Goodwin Procter LLP

(57) ABSTRACT

Disclosed are system and methods for simulating signal integrity structures using stable processed modes (e.g., matched traveling-wave power modes), and/or for creating response surfaces from stable response parameters.

35 Claims, 4 Drawing Sheets

(56) References Cited

OTHER PUBLICATIONS

B. Anderson, E. Braken, J. Manges, G. Peng, Z. Cendes, "Full-Wave Analysis in SPICE via Model-Order Reduction", pp. 2314-2320, IEEE 2004.*

Peng et al, Non-conformal domain decomposition method with second-order transmission conditions for timeharmonic electromagnetics, Journal of Computational Physics 229, Apr. 10, 2010, pp. 5615-5629.

Zhao et al, A Domain Decomposition Method With Nonconformal Meshes for Finite Periodic and Semi-Periodic Structures IEEE Transactions on Antennas and Propagation, vol. 55, No. 9, Sep. 2007.

Wolfe et al, A Parallel Finite-Element Tearing and Interconnecting Algorithm for Solution of the Vector Wave Equation with PML Absorbing Medium IEEE Transaction on Antennas and Propagation, vol. 48, No. 2, Feb. 2000.

Mayo et al., A Framework for the Solution of the Generalized Realization Problem, Linear algebra and its applications 425.2 (2007):634-662.

Al-Nashi, Phase unwrapping of digital signals, 1989, IEEE Transactions on Acoustics, Speech, and Signal Processing, 37(11)1693-1702.

Karam et al., Computation of the One-Dimensional Unwrapped Phase, 2007, Proceedings of the 2007 15th International Conference on Digital Signal Processing, pp. 304-307.

Tribolet, J., A new phase unwrapping algorithm, 1977, IEEE Transactions on Acoustics, Speech, and Signal Processing, ASSP-25(2):170-177.

Tripathi et al., A SPICE model for multiple coupled microstrips and other transmission lines, 1985, IEEE Transactions on Microwave Theory and Techniques, MTT-33(12):1513-1518.

Antoulast A.C., On the Scalar Rational Interpolation Problem, IMA Jrl. of Mathematical Control and Information, 3:61-88 (1986).

Benner et al., Partial Realization of Descriptor Systems, Systems and Control Letters, 55(11):929-938 (Jun. 13, 2006 preprint).

Blackburn, Fast Rational Interpolation, Reed-Solomon Decoding, and the Linear Complexity Profiles of Sequences. IEEE Transactions on Information Theory, 43(2): 537-548 (Mar. 1997).

Bracken et al. S-Domain Methods for Simultaneous Time and Frequency Characterization of Electromagnetic Devices, IEEE Transactions on Microwave Theory and Techniques, 46(8):1277-1290 (1998).

Cal et al, Displacement Structure of Weighted Pseudoinverses, Applied Mathematics and Computation,—153(2):317-335 (Jun. 4, 2004).

Chen, et al, Per-Unit-Length RLGC Extraction Using a Lumped Port De-Embedding Method for Application On Periodically Loaded Transmission Lines, 2006 Electronic Components and Technology Conference, pp. 1770-1775.

Degerstrom et al, Accurate Resistance, Inductance, Capacitance, and Conductance (RLCG) From Uniform Transmission Line Measurments, Proceedings of the 18th Topical Meeting on Electrical Performance of Electronic Packaging, Oct. 2008, pp. 77-80.

Eisenstadt et al, S-Parameter-Based IC Interconnect Transmission Line Characterization, IEEE Transactions on Components, Hybrids, and Manufacturing Technology, 15(4): 483-490 (Aug. 1992).

Fitzpatric, On the Scalar Rational Interpolation Problems, Math, Control Signals Systems, 9:352-369 (1996).

Gallivan et al, Model Reduction of MIMO Systems Via Tangential Interpolation, SIAM J. Matris Anal. Appl., 26(2):328-349 (2004).

Gallivan et al, Model Reduction via Tangental interpolation, MTNS2002 (15th Symp. on the Mathematical Theory of Networks and Systems) (2002) 6 pages.

Gallivan et al, Model Reduction via Trancation: An Interpolation Point of View, Linear Algebra and its Applications, 375:115-134 (2003).

Gruodis, et al, Coupled Lossy Transmission Line Characterization and Simulation, IBM J. Res. Develop., 25(1): 25-41 (Jan. 1981).

Han et al, Frequency-Dependent RLGC Extraction for a Pair of Coupled Transmission Lines Using Measured Four-Port S-Parameters, 63rd ARTFG Conference Digest, Jun. 2004, pp. 211-219.

Hill et al, Crosstalk Between Microstrip Transmission Lines, IEEE Transactions on Electromagnetic Compatibility, 36(4):314-321 (Nov. 1994).

Hiptmair, Symmetric Coupling for Eddy Current Problems. SIAM J Numer. Anal. 40(1):41-65 (2002).

Karam, Computation of the One-Dimensional Unwrapped Phase, Massachusetts Institute of Technology Thesis, Jan. 2006, 101 pages.

Kim et al, Implementation of Broadband Transmission Line Models With Accurate Low Frequency Response for High-Speed System Simulations, DesignCon 2006, 25 pages.

Kiziloglu et al, Experimental Analysis of Transmission Line Parameters in High-Speed GaAs Digital Curcuit Interconnects, IEEE Transactions on Microwave Theory and Techniques, 39(*8):1361-1367 (Aug. 1991).

Knockaert et al, Recovering Lossy Multiconductor Transmission Line Parameters From Impedance or Scattering Representations, Proceedings of the 10th Topical Meeting on Electrical Performance of Electronic Packaging, Cambridge, MA, Oct. 2001, pp. 35-38.

Knockaert et al, Recovering Lossy Multiconductor Transmission Line Parameters From Ipedance or Scattering Representations, IEEE Transactions on Advanced Packaging. 25(2):200-205 (May 2002).

Lalgudi et al, Accurate Transient Simultation of Interconnects Characterization by Brand-Limited Data With Propagation Delay Enforcement In a Modified Nodal Analysis Framework, IEEE Transactions on Electromagnetic Compatibility, 50(3):715-729 (Aug. 2008).

Lee et al, A Non-Overlapping Domain Decomposition Method with Non-Matching Grids for Modeling Large Finite Antenna Arrays, J. Comput. Phys., 203:1-21 (Feb. 2005).

Lefteriu et al, Modeling Multi-Port Systems from Frequency Response Data via Tangential Interpolation, IEEE, 4 pages (2009).

Leung et al, Characterization and Attentuation Mechanism of CMOS-Compatible Micromachined Edge-Suspended Coplanar Waveguides on Low-Resistivity Sillicon Substrate, IEEE Transactions oon Advanced Packaging, 29(3):496-503 (Aug. 2006).

Li et al, Model Order reduction of Linear Networks With Massive Ports via Frequency-Dependent Port Packaging, 2006 43rd ACM/IEEE Design Automation Conference, pp. 267-272 (2008).

Narita et al, An Accurate Experimental Method for Characterizing Transmission Lines Embedded in Multilayer Printed Circuit Boards, IEEE Transactions on Advanced Packaging, 29(1):114-121 (Feb. 2006).

Oh et al. Improved Method for Characterizing Transmission Lines Using Frequency-Domain Measurements, Proceedings of the 13th Topical Meeting on Electrical Performance of Electronic Packaging, pp. 127-130 (Jul. 2004).

Sampath, On Addressing the Practical Issues in the Extraction of RLGC Parameters for Lossy Multiconductor Transmission Lines Using S-Parameter Models, Proceedings of the 18th Topical Meeting on the Electrical Performance of Electronic Packaging, pp. 259-262 (Oct. 2006).

Schrama, Approximate Identification and Control Design with Application to a Mechanical System, Delft University of Technology, Thesis, 294 Pages (1992).

Vandendorpe, Model Reduction of Linear Systems, and Interpolation Point of View, Univ. Catholique de Louvain, Center for Systems Engineering and Applied Mechanics, 162 pages (Dec. 1, 2004).

Woracek, Multiple Point Interpolation in Nevanlinna Classes, Integral Equations and Opreator Theory, 28(1):97-109, (Mar. 1997).

Antoulas, A new result on passivity preserving model reduction, Systems & amp: Control Letters, 54(4): 361-374, Apr. 2005.

Astolfi, A new look at model reduction by moment matching for linear systems, Decision and Control, 2007 46th IEEE Conference, pp. 4361-4366, Dec. 12-14, 2007.

Hebermehl et al, Improved numerical methods for the simulation of microwave circuits, 1997, Weierstrass Institute for Applied Analysis and Stochastics, pp. 1-14.

Gutknecht, Block Krylov Space Methods for Linear Systems with Multiple Right-hand sides: An Introduction, pp. 1-22, 2006.

Badics et al, A Newton-Raphson Algorithm With Adaptive Accuracy Control Based on a Block-Preconditioned Conjugate Gradient Technique, pp. 1652-1655, 2005.

* cited by examiner

SIMULATING SIGNAL INTEGRITY STRUCTURES

FIELD OF THE INVENTION

The present invention relates generally to systems and methods for the design and analysis of electromagnetic structures, and more specifically to electromagnetic simulations of signal integrity structures.

BACKGROUND

Electromagnetic (EM) structures can often be characterized, at least approximately, by a linear response function that relates input signals to output signals. For example, a microwave or radio-frequency (RF) structure (i.e., an electromagnetic device designed for operation at signal wavelengths in the microwave or radio-wave regime) may be represented as a black box that is excited by transmission lines, and described in terms of a scattering matrix that relates ingoing transmission line modes to outgoing transmission line modes. Electromagnetic structures excited by transmission lines are hereinafter referred to as signal integrity (SI) structures. Generally, each transmission line of an SI structure includes two or more distinct conductor traces, one of which is usually considered to be a local reference ground, whereas the other ones are considered to be signal traces. In a black-box representation, the interfaces of the SI structure with the transmission lines are termed ports, and the intersections of the individual signal traces with the ports are called terminals. FIG. 1A illustrates an exemplary SI structure 100 that includes two planar ports 102, 104, each containing three terminals, and FIG. 1B schematically depicts a black-box representation of that structure.

The response of an SI structure to an input signal generally depends on the geometry, materials, and operating frequency of the structure (hereinafter referred to as "design variables"). Simulating an SI structure across a range of values of the design variables in a manner that facilitates comparisons between the resulting responses represents a difficult problem.

In addition to changing the design variables of the SI structure to be analyzed, engineers often want to model the SI structure as embedded in a network or fixture, or—conversely—computationally remove the effect of such a network or fixture. This is called "de-embedding." Another important capability of a good simulation is "renormalization," which accounts for mismatches between the material properties or geometries of the external transmission lines and those of the internal transmission lines. These requirements further complicate the already challenging problem of modeling a highly complex system to permit engineers to vary system designs and, without actually building those designs, predict and understand their real-world behavior.

SUMMARY

The present invention generally provides systems and methods that facilitate simulating SI structures for a range of values of one or more design variable(s) in a manner that is consistent over a wide range of design variables, and which accommodates both de-embedding and renormalization.

In general, the invention relates to characterizing SI structures in terms of response parameters, i.e., parameters indicative of a relationship between input and output signals of the SI structure (including, for example, scattering, impedance, and/or admittance parameters). More specifically, various embodiments involve varying one or more design variables of the SI structure, and ascertaining how the response parameters depend on the design variable(s). By comparing the response parameters obtained for different values of a design variable, or different sets of values of a plurality of design variables, engineers can improve and/or optimize the design of the SI structure; graphical representations of the response parameters may aid in this process.

Technical Context and Problem Statement

To determine the response function (such as, e.g., the scattering matrix) of an SI structure, the total electric and magnetic fields $\vec{E}, \vec{H}$ at the ports may be represented as a superposition of eigenmodes $\vec{e}_j, \vec{h}_j$, i.e., oscillatory electric and magnetic fields that can exist inside infinite transmission lines having cross sections and material properties equal to those of the respective ports (in other words, the "natural" modes of the transmission lines modeled by the port). For a port with M+1 conductors (one of which is the reference conductor), the eigenmode representation typically includes M eigenmodes—the quasi-transverse EM (quasi-TEM) modes:

$$\vec{E} = \sum_{j=1}^{M} (a_j + b_j)\vec{e}_j \text{ and } \vec{H} = \sum_{j=1}^{M} (a_j - b_j)\vec{h}_j,$$

wherein $a_j$ and $b_j$ are unitless complex amplitudes of the ingoing and outgoing fields, respectively. (While the port theoretically supports an infinite number of eigenmodes, the remaining, so-called "waveguide" modes are higher-order modes, which generally do not propagate efficiently at frequencies of practical interest, and are therefore not included in the black-box representation of the SI structure).

The input-output behavior of an SI structure expressed in terms of its scattering matrix S may then be obtained from modal excitations (i.e., inputs corresponding to the eigenmodes) of the ports, using any of a number of numerical electromagnetic simulation methods known to persons of skill in the art, such as, for example, a finite element method (e.g., the transfinite element method), a boundary element method (also referred to as method of moments), or a finite difference method. Numbering the eigenmodes of the various ports consecutively (such that modes $1 \ldots M^{(1)}$ are the $M^{(1)}$ quasi-TEM modes of port 1, modes $M^{(1)}+1 \ldots M^{(1)}+M^{(2)}$ are the $M^{(2)}$ quasi-TEM modes of port 2, etc.), a matrix element (or "scattering parameter") $S_{ij}$ of the scattering matrix represents the amplitude $b_i$ of outgoing mode i when excited through ingoing mode j (i.e., with $a_j=1$ and all other ingoing modes set to zero). Diagonal elements correspond to reflected modes. In vector notation (using a bar rather than an arrow above the symbol to denote a vector, to distinguish from physical vectors such as $\vec{e}_j$), the modal scattering matrix S relates the ingoing and outgoing eigenmodes according to:

$$\bar{b} = S\bar{a}.$$

The response functions of an SI structure (e.g., the scattering parameters) generally depend, as noted above, on the design variables. Further, the eigenmodes—which serve as inputs for simulations of the response of the SI structure—are themselves controlled by the operating frequency and the geometry and materials of the transmission lines modeled by the ports. Therefore, in order to compare the responses of an SI structure for different choices of the design variables, the eigenmodes generally must be determined, and the simulation carried out, multiple times for the different sets of design variables. In the design and analysis of SI structures, it is often desirable to characterize the response for a continuum of design variables. Customarily, such a characterization takes the form of one or more "response surfaces," each response surface representing the variations of a response parameter, such as a scattering parameter or a quantity derived therefrom, as a function of one or more design variables.

To computationally remove the effect on the simulation of a network or fixture—for example, in order to isolate the response of an SI structure under test from the joint response of the SI structure and a test fixture interconnecting with it (e.g., for the purpose of measuring the response parameters)—the contribution of the test fixture itself may be computationally eliminated by de-embedding. Typically, this is accomplished by post-processing the modal scattering matrix to include the effect of adding or removing a certain length of transmission line attached to the ports. More specifically, the de-embedded modal scattering matrix $S^d$ is generally related to the original modal scattering matrix S by $S^d = e^{\gamma d} S e^{\gamma d}$. Herein, $e^{\gamma d}$ is a diagonal matrix $e^{\gamma d} = \text{diag}(e^{\gamma_1 d_1}, e^{\gamma_2 d_2}, \ldots, e^{\gamma_N d_N})$ whose blocks (i.e., submatrices) $e^{\gamma_k d_k} = \text{diag}(e^{\lambda_1 d_k}, e^{\lambda_2 d_k}, \ldots, e^{\lambda_M d_k})$ correspond to the different ports of the SI structure, and wherein $d_k$ denotes the de-embedding length of port k, and $\lambda_1, \lambda_2, \ldots, \lambda_M$ denote the propagation constants of the eigenmodes in that port.

The external transmission lines may be characterized with associated impedance parameters, called "reference impedances." The simulation of the SI structure is typically carried out under the assumption that the reference impedances equal the "characteristic impedances" of the transmission lines modeled by the ports, i.e., that the material properties and geometries of the external and internal transmission lines are the same (i.e., "match"), so that discontinuities and reflections at the ports are avoided. The eigenmodes characterizing the SI structure then "match" the eigenmodes of the transmission lines. In practical test settings, however, the external transmission lines are often not matched, and as a result, the measured scattering parameters are different from those obtained through the simulation. Renormalization, which involves transforming the scattering matrix so as to take the different material properties into account, results in computed values of the scattering parameters for the non-matched case which facilitate direct comparisons between simulated and measured parameters.

Response surfaces of an SI structure can, in principle, be obtained by simulating the SI structure for two or more discrete sets of design variables to obtain discrete values for the elements of the scattering matrix, de-embedding and/or renormalizing the scattering matrix if desired, and then interpolating between the discrete parameter values. However, obtaining smooth, continuous response functions, and consequently the success of this approach, is contingent upon the ability to "track" the eigenmodes as the design variables are varied, i.e., to identify, for any two sets of design variables, pairs of modes (one from each of the two sets) that correspond to one another. In some cases, eigenmodes may be distinguished by their associated propagation constants, which determine how the complex phase and amplitudes of the modes change as the modes travel along the transmission line. Often, however, some or all the modes have similar or the same propagation constants (i.e., are, at least in a practical sense, degenerate), which renders it very difficult to numerically keep track of these modes as the design variables are changed. As a result, the interpolation may fail to produce a consistent, smooth response surface.

In some applications, even though the eigenmodes may not be easily trackable, the response surface of a certain response parameter of interest, e.g., a quantity derived from the scattering matrix using matrix transformation, may be trackable due to the properties of the particular transformation. Even in those cases, however, it is often impractical to interpolate de-embedded and/or renormalized response surfaces because they can be more rapidly changing functions of the design variables, and therefore require either a large number of simulation points (i.e., solutions for many value sets of the design variables) or a complicated interpolation function based on a large number of interpolation basis functions.

Accordingly, there is a need for alternative, more efficient methods of simulating SI structures to obtain response surfaces. In particular, there is a need for methods that track modes while changing design variables, and that facilitate interpolation, de-embedding, and renormalization of response surfaces.

Detailed Overview

Various embodiments of the invention circumvent mode-tracking difficulties associated with conventional SI simulations by using stable processed modes, rather than eigenmodes, as the simulation input. Stable processed modes are linear combinations of eigenmodes that can readily be tracked between different values of the design variables. Like processed modes in general, stable processed modes can be obtained from eigenmodes by matrix transformation (i.e., "processing"). For example, the eigenmodes may be processed such that each of the resulting set of modes is directly related to one of the terminals of the SI structure; such modes are hereinafter called "terminal modes." Terminal modes are automatically tracked as the design variables are changed (i.e., different modes are distinguished by, and corresponding pairs of modes for any two different sets of design variables are identified based on, their associated terminals), provided that the conductors do not make contact with one another or with the reference conductor. One important group of terminal modes are modes that represent ingoing and outgoing travelling waves expressed in units of Watts$^{1/2}$—hereinafter referred to as "travelling-wave power modes." These modes are closely related to the currents and voltages at the terminals, as explained in more detail below. Other examples of terminal modes include "current modes," each of which induces a current in one particular terminal, and "voltage modes," each of which applies a voltage on one particular terminal.

Terminal modes can generally be computed for arbitrary reference impedances of the external transmission lines. In preferred embodiments, however, "matched terminal modes," i.e., modes computed for reference impedances that equal the characteristic impedances of the SI structure, are used. Matched terminal modes are linear combinations of only the ingoing eigenmodes; the required amplitudes of the outgoing eigenmodes are zero. In contrast to arbitrary terminal modes, therefore, the computation of matched terminal modes does not require knowledge of the eigenmode scattering matrix.

Simulations of the SI structure based on stable processed modes result in stable response parameters, i.e., parameters that can, like the associated modes, be tracked between different values of the design variables. For example, simulations using (matched) travelling-wave power modes directly result in (matched) terminal scattering parameters (which, collectively, form the (matched) terminal scattering matrix). In some embodiments, other terminal parameters, such as, e.g., impedance or admittance parameters, are computed from the terminal scattering parameters. While the terminal scattering matrix relates ingoing and outgoing travelling waves (i.e., the travelling-wave power modes), the impedance matrix relates currents and voltages at the terminals.

To characterize the behavior of the SI structure as a function of one or more design variables, the SI structure may be simulated with stable processed modes for different discrete sets of values of the design variable(s), resulting in stable response parameters for each set. (A "set" of values may consist of a single value if only one design variable is modified). The stable response parameters may then be interpolated between the discrete sets to yield a smooth, consistent response surface. In certain alternative embodiments, the SI structure is simulated using eigenmodes, and the resulting scattering matrix is subsequently transformed into a terminal scattering matrix (or other set of stable response parameters). Because the terminal parameters are each associated with a particular terminal, interpolation likewise results in a consistent response surface. Both approaches facilitate mode-tracking and improve interpolation capabilities, compared with the creation of response surfaces from eigenmode scattering parameters. The use of terminal modes in the simulations of the SI structure bears the additional advantage that the simulation directly provides the terminal scattering matrix, without any need for additional transformations, which are often computationally expensive.

The response surface may be de-embedded, re-normalized, or otherwise post-processed, at points of interest, i.e., for particular user-selected values of the design variable(s). By interpolating before, not after, de-embedding and/or renormalization, the need to interpolate a rapidly varying response surface is generally avoided. Consequently, the response surface (before de-embedding and/or renormalization) can be represented with fewer interpolation basis functions, and fewer simulations will be required. Both effects contribute to increased efficiency. In preferred embodiments, the de-embedding procedure utilizes an interpolated, processed matrix of propagation constants associated with the eigenmodes. For each set of values of the design variables and each de-embedding distance of interest, de-embedded response parameters may then be computed from the corresponding points of the response surface and the interpolated matrix of propagation constants.

In a first aspect, the invention provides a computer-implemented method of simulating an SI structure excitable via transmission lines. The method includes constructing and storing stable processed modes for the SI structure; and computationally simulating the SI structure using the stable processed modes. In some embodiments, the stable processed modes are or include matched terminal modes (such as, e.g., travelling-wave power modes, current modes, or voltage modes). The stable processed modes may be constructed by processing eigenmodes, which, in turn, may be constructed by simulating the transmission lines. Both the construction of the stable processed modes and the simulation of the SI structure may utilize a finite element method.

Computationally simulating the SI structure may include providing an input signal, e.g., by computationally exciting a stable processed mode at an interface of the SI structure with the transmission lines. The simulation returns an output signal based on the input signal. In various embodiments, the SI structure is characterized by one or more parameters indicative of a relationship between the input signal and the output signal, such as, e.g., terminal scattering parameters, terminal admittance parameters, and/or terminal impedance parameters. The parameter(s) may de-embedded or renormalized.

The method may further include varying one or more design variables (such as, e.g., a material property, geometric variable, and/or operating frequency) of the SI structure and repeating the construction of stable processed modes and the simulation of the SI structure for the varied design variable. The stable processed modes may be tracked during the variation of the design variable(s). Based on the tracked stable processed modes, a functional dependence of the parameter on the design variable(s) may be determined, e.g., by interpolating the parameter(s) between multiple values of the design variable(s). The functional dependence, or the parameters themselves, may be graphically represented. The parameter(s) may be de-embedded or renormalized following interpolation.

In a second aspect, various embodiments are directed to a method of characterizing an SI structure excitable via and interfacing with transmission lines at a plurality of ports. For each of a plurality of values of one or more design variable(s) of the SI structure, modes are computationally excited as input signals at the ports, and the SI structures is computationally simulated to determine output signals at the ports. Based on the input signals and the output signals, one or more stable parameters (such as, e.g., terminal parameters) are determined. The stable parameter(s) are tracked and interpolated between the different values of the design variable so as to determine a functional dependence of the parameter(s) on the design variable. The interpolated parameter(s) may then be post-processed (e.g., de-embedded or renormalized) for user-selected values of the design variable.

In some embodiments, matched terminal modes (such as, e.g., travelling-wave power modes, current modes, or voltage modes) are excited at the ports. In alternative embodiments, eigenmodes are excited at the ports, one or more first parameters indicative of a relationship between the input and output signals of the simulation are determined, and the stable parameters are obtained by processing the first parameters.

In a third aspect, a system for simulating a signal integrity structure excitable via transmission lines is provided. The system includes a memory for storing data representative of the signal integrity structure and the transmission lines, and one or more simulation modules in communication with the memory, for simulating the transmission lines to construct stable processed modes and for simulating the signal integrity structure using the stable processed modes.

In a fourth aspect, the invention is directed to a system for characterizing an SI structure. The system includes a memory for storing data representative of the SI structure for a plurality of values of one or more design variable(s). Further, it includes simulation and interpolation modules in communication with the memory. The simulation module simulates the SI structure (using, in some embodiments, stable processed modes) to determine at least one stable parameter. The interpolation module interpolates the stable parameter(s) between different values of the design variable(s) to determine its functional dependence thereon. The system may, moreover, include a post-processing module in communication with the memory, which serves to de-embed and/or renormalize the stable parameter(s).

In a fifth aspect, the invention provides a method for de-embedding a response surface of an SI structure. The method involves obtaining the response surface by simulating the signal integrity structure for a plurality of values of at least one design variable, and interpolating at least one stable response parameter resulting from the simulation between the plurality of values. Further, the method includes interpolating a processed matrix of propagation constants associated with eigenmodes of the SI structure, and constructing, for each of multiple user-selected values of the design variable(s), a de-embedding matrix from a desired de-embedding distance and the processed matrix of propagation constants (e.g., from eigenvalues and eigenvectors of the processed matrix of propagation constants). The response surface may then be de-embedded using the de-embedding matrix. The de-embedding distance corresponds to a length by which an external transmission line interfacing with the SI structure is extended.

In a sixth aspect, the invention provides a system for de-embedding a response surface of a signal integrity structure excitable via transmission lines. The system comprises a memory for storing data representative of the response surface (which represents a dependence of one or more stable response parameters on one or more design variables within a range of the design variables) and propagation constants associated with eigenmodes of the transmission lines. Further, the system provides an interpolation module for interpolating a processed matrix of the propagation constants, and a de-embedding module that facilitates, for any user-selected value of the design variable within the range of values, de-embedding the response surface according to the method described above.

BRIEF DESCRIPTION OF THE DRAWINGS

The foregoing will be more readily understood from the following detailed description and the accompanying drawings, in which.

DETAILED DESCRIPTION

In various embodiments, the invention facilitates variation in one or more design variables of the SI structure, and determination of how the response parameters depend on the design variable(s). For many applications, it is useful to determine the functional dependence of response parameters on a continuum or quasi-continuum of a design variable. (A quasi-continuum is a set of discrete values which are so densely spaced that they can, for practical purposes, be considered a continuum). For example, the scattering parameters may be computed—and plotted—as a function of the operating frequency of the structure. In general, each response parameter is a multivariate function of n design variables, resulting in an n-dimensional response surface in (n+1)-dimensional space.

Response parameters can be determined by computationally simulating the SI structure. In various embodiments of the instant invention, such simulations start with an eigenmode representation of the fields at the ports, which is subsequently converted to a terminal representation. The eigenmodes of the SI structure depend on the geometry and material properties of the ports, and are typically obtained numerically, for example, using a two-dimensional FEM eigenmode solver. Alternatively, for certain port designs, it may be possible to find analytical expressions for the eigenmodes. Techniques for constructing eigenmodes are generally known in the art.

Figure 1A:
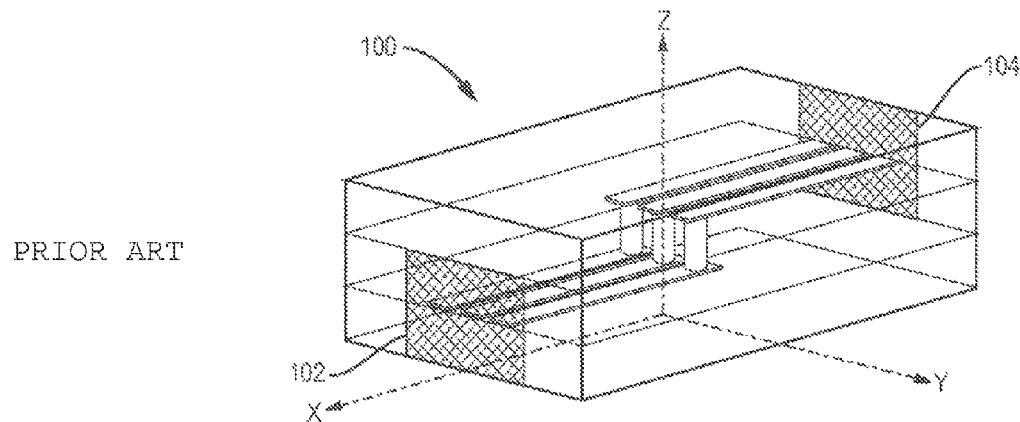
FIG. 1A is a schematic drawing of an SI structure in accordance with one embodiment.
Figure 1B:
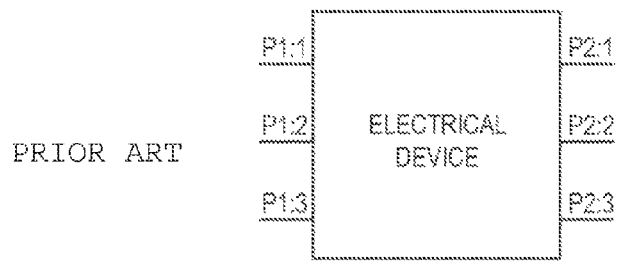
FIG. 1B is a schematic drawing of a black-box representation of the structure depicted in FIG. 1A.
Figure 2A:
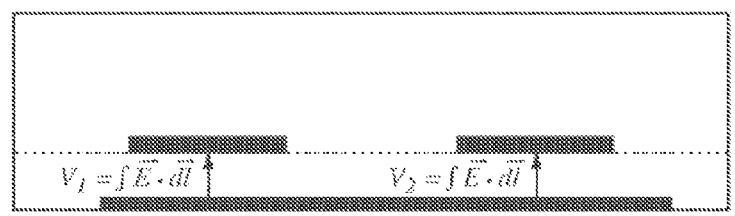
FIG. 2A is a schematic drawing of a port, illustrating integration paths for deriving voltages from known electric fields at the ports.
Figure 2B:
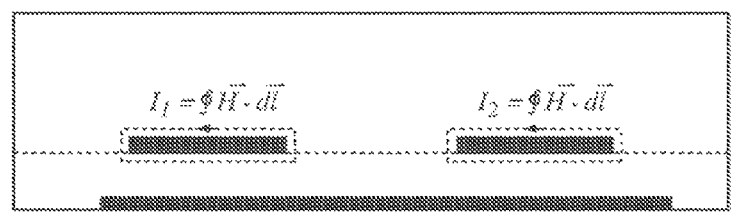
FIG. 2B is a schematic drawing of a port, illustrating integration paths for deriving currents from known magnetic fields at the ports.

Once the eigenmodes $\vec{e}_j$, $\vec{h}_j$ are known and the electric and magnetic fields $\vec{E}$, $\vec{H}$ at the ports have been expanded in terms of eigenmodes, a terminal representation may be derived, for example, by using Maxwell's equations to calculate the voltages $v_i$ and currents $i_i$ applied at the terminals. For that purpose, integration paths $C_i$ may be defined between each terminal and the reference conductor of the port, and integration loops $L_i$ may be defined around each terminal, as illustrated in FIGS. 2A and 2B, respectively. The terminal voltages and currents depend on the eigenmodes and associated ingoing and outgoing mode amplitudes $a_j$, $b_j$ according to:

$$v_i = \oint_{C_i} \vec{E} \cdot d\vec{l} = \sum_{j=1}^{M}(a_j+b_j)\oint_{C_i} \vec{e}_j \cdot d\vec{l} = \sum_{j=1}^{M}(a_j+b_j)T_{ij}$$

$$i_i = \oint_{L_i} \vec{H} \cdot d\vec{l} = \sum_{j=1}^{M}(a_j-b_j)\oint_{L_i} \vec{h}_j \cdot d\vec{l} = \sum_{j=1}^{M}(a_j-b_j)U_{ij}$$

where T and U are block diagonal matrices (i.e., matrices that have non-zero elements only in sub-matrices, or "blocks," whose diagonals coincide with the diagonal of the larger matrix), where each block on the diagonal corresponds to a port and has a block size (i.e., number of rows and columns in the block) equal to the number of terminals M on that port. The matrix elements $T_{ij}$ and $U_{ij}$ are integrals of the eigenmodes over the integration paths $C_i$ and $L_i$, respectively. While T and U may both be directly computed via integration, in some embodiments, only one of the matrices is computed by integrating the eigenmodes over the respective integration paths, and the other matrix is derived using power conservation conditions (which, themselves, involve integrations of the vector product $\vec{e}_i \times \vec{h}_j$ for all combinations of i and j over the entire port). For example, U may be computed by integrating the magnetic fields over the integration paths $L_i$, and T may be computed from U and the power conservation laws.

The matrices T and U are related to the characteristic impedance matrix $Z_0$ of the transmission lines modeled by the ports according to $Z_0=TU^{-1}$. Using the scattering matrix S of the eigenmodes, the currents and voltages can be expressed in terms of only the ingoing eigenmodes:

$$\bar{v}=T(\bar{a}+\bar{b})=T(I+S)\bar{a}$$

$$\bar{i}=U(\bar{a}-\bar{b})=U(I-S)\bar{a}$$

where I is the identity matrix. Bars above the symbols denote vectors whose components are associated with the modes and/or terminals of the SI structure. (By contrast, arrows above symbols denote two- or three-dimensional physical vectors, such as the electric fields vectors for the various eigenmodes).

The relationship between voltages and currents at the terminals defines the terminal impedance matrix Z of the SI structure: $\bar{v}=Z\bar{i}$. The terminal impedance matrix Z may also be computed from the eigenmode scattering matrix S and the matrices U and T:

$$Z=T(I+S)(I-S)^{-1}U^{-1}$$

The terminal impedance parameters, i.e., the entries of Z, are stable response parameters, which are independent of external transmission lines. Sometimes it is desirable to characterize the SI structure in terms of a terminal scattering matrix $S_t$, i.e., a scattering matrix that relates ingoing and outgoing travelling waves of external transmission lines connected to the ports. For that purpose, the voltages and currents may be expanded in terms of travelling-wave power modes:

$$\vec{v} = Z_{ref}^{1/2}(\vec{\alpha}+\vec{\beta})$$

$$\vec{i} = Z_{ref}^{-1/2}(\vec{\alpha}-\vec{\beta})$$

where $\vec{\alpha}$ and $\vec{\beta}$ are vectors of the complex amplitudes of the ingoing and outgoing travelling-wave power modes, respectively. The reference impedance matrix $Z_{ref}$ is a block-diagonal matrix, each of whose blocks represents a (typically multi-conductor) semi-infinite external transmission line connected to a port, and relates the voltages at the port and the currents flowing in the external transmission line. If the external transmission lines "match" the transmission lines modeled by the ports, the reference impedance matrix $Z_{ref}$ equals the characteristic impedance matrix $Z_0$. The terminal scattering matrix $S_t$, which relates the ingoing and outgoing travelling-wave power modes according to $\vec{\beta}=S_t\vec{\alpha}$, constitutes—like the terminal impedance matrix—a matrix of stable response parameters. It may be computed from the terminal impedance matrix $Z$ and the reference impedance matrix $Z_{ref}$ by:

$$S_t = Z_{ref}^{1/2}(Z+Z_{ref})^{-1}(Z-Z)Z_{ref}^{-1/2}.$$

In various embodiments, stable parameters are obtained directly from simulations of SI structures by using stable processed modes to computationally excite the SI structures. In general, processed modes are linear combinations of the eigenmodes $\vec{e}_j$ associated with a particular port of the SI structure. For a port k with M terminals, a set of processed modes $\vec{e}^{pm} = \{\vec{e}_1^{pm}, \vec{e}_2^{pm}, \ldots, \vec{e}_M^{pm}\}^T$ can be obtained from the set of eigenmodes $\vec{e} = \{\vec{e}_1, \vec{e}_2, \ldots, \vec{e}_M\}^T$ of port k by applying a transformation matrix $R_k$ (which is associated with port k):

$$\vec{e}^{pm} = R_k \vec{e}.$$

(The superscript "T" represents the transpose; i.e., $\vec{e}^{pm}$ and $\vec{e}$ are column vectors of modes). The transformation matrices $R_k$ for the individual ports form the diagonal blocks of a transformation matrix $R = \text{diag}(R_1, R_2, \ldots, R_N)$ for an SI structure with N ports. The transformation matrix R depends on or, conversely, determines the type of stable processed modes resulting from the transformation. For example, with a transformation matrix $R = (Z_0^{-1/2})^T U^{-T}$ the processed modes will be matched traveling-wave power modes; with $R=U^{-T}$, current modes will obtained; and with $R=T^{-T}$, voltage modes result.

In some embodiments, stable response parameters are obtained by post-processing the scattering matrix S for the eigenmodes, rather than by simulating the SI structure using stable processed modes. In general, the scattering matrix $S_{pm}$ for the processed modes can be obtained from the eigenmode scattering matrix S according to:

$$S_{pm} = (R^{-1})SR^T.$$

The U and T matrices can also be computed for processed modes:

$$U_{pm} = UR^T$$

$$T_{pm} = TR^T.$$

The terminal impedance matrix may be computed from $S_{pm}$, $U_{pm}$, and $T_{pm}$:

$$Z = T_{pm}(I+S_{pm})(I-S_{pm})^{-1}U_{pm}^{-1}.$$

Figure 3:
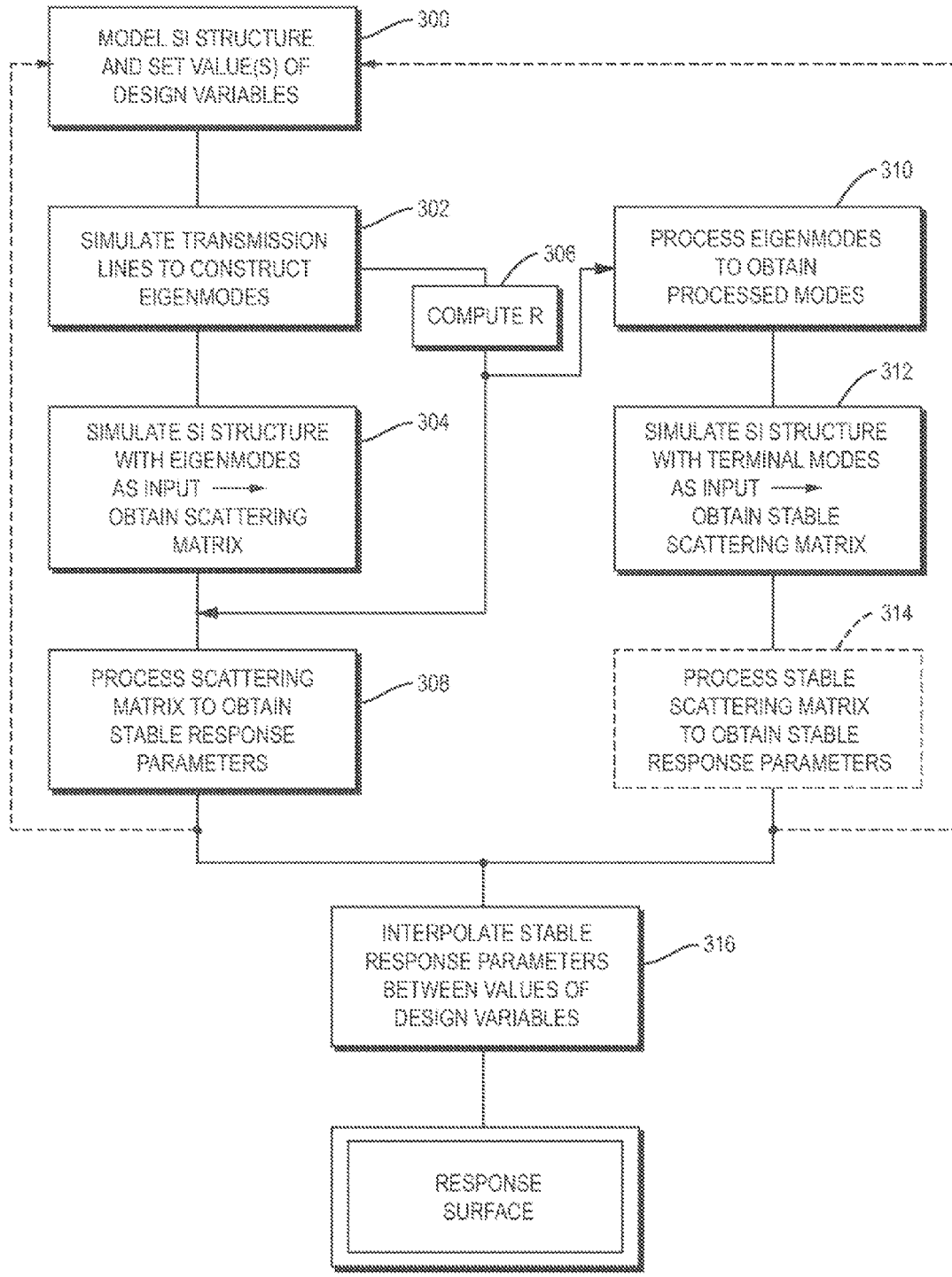
FIG. 3 is a flow chart illustrating methods in accordance with various embodiments for simulating and characterizing SI structures.

FIG. 3 illustrates, in a flow-diagram, various exemplary methods in accordance with the invention for generating response surfaces for stable response parameters. In a first step 300, the SI structure is mathematically modeled, i.e., its geometric structures and material properties are specified. The model may include a number of design variables, i.e., geometric, material, and/or operational parameters that are not fixed at the outset, but are to be determined based on simulations of the SI structure. The design variables may, but need not, include parameters associated with the ports of the SI structure.

In the next step 302, eigenmodes of the SI structure are constructed. Typically, this involves simulating the transmission lines modeled by the ports, using, e.g., a finite element method. In some embodiments, the SI structure is then simulated, with the eigenmodes as inputs (step 304), to obtain the scattering matrix S. Further, based on the eigenmodes and the model of the SI structure (from which, for example, $Z_0$ can be determined), a suitable transformation matrix R is computed (step 306), for example, using one of the equations listed above. In step 308, the scattering matrix S is post-processed with the matrix R to yield stable response parameters (such as, e.g., the matched terminal scattering matrix $S_t$).

In alternative embodiments, illustrated in the right branch of the flow chart of FIG. 3, the eigenmodes are processed using transformation matrix R (step 310) to obtain stable processed modes (such as, e.g., matched traveling-wave power modes). These stable modes are subsequently used to simulate the SI structure (step 312), resulting directly in a stable scattering matrix (e.g., a matched terminal scattering matrix). If other stable parameters (such as, e.g., impedance or admittance parameters) are desired, they are typically obtained from the scattering matrix by post-processing (step 314) (although, in some embodiments, they may be obtained directly via simulation). Thus, both the simulation of the SI structure with eigenmodes (and subsequent transformation of the eigenmode scattering matrix), and the simulation of the SI structure with stable processed modes, may provide stable response parameters. Using stable processed modes in the simulation has the advantage that the required transformation of the modes is usually less computationally expensive than the transformation of the scattering matrix.

The simulation and processing steps described above may be repeated for different sets of values of the design variable(s). If the design variables specified in step 300 include the operating frequency or any properties of the ports, it may be necessary to construct new eigenmodes for each set of values. If, however, the design variables include only internal geometric or material parameters of the SI structure, and the port definitions remain the same, the construction of eigenmodes (step 302) may not need to be repeated. In step 316, the stable response parameters (in particular, scattering parameters) obtained for various values of the design variables are interpolated, using any of a variety of interpolation basis functions, such as, e.g., low-order polynomial functions (including, e.g., splines), rational functions (including, e.g., B-splines), or state-space models. The interpolation results in a response surface, which is generally—as a consequence of the automatic mode-tracking of stable response parameters—smooth and consistent. Characterizing the SI structure with stable response parameters may, in some embodiments, facilitate generating response surfaces where obtaining response surfaces for non-stable parameters would be difficult or impossible, and may, in other embodiments, reduce the number of independent interpolation basis functions required to interpolate the response parameters with a desired accuracy.

For various applications—including, in particular, comparisons of simulation results with experimentally determined response characteristics of an SI structure—it may be desirable to de-embed and/or renormalize the response surface, i.e., to account for changes in the dimensions and/or material properties of external transmission lines (such as, e.g., the transmission lines of test fixtures). In general, de-embedding operates on the scattering matrix, which may subsequently be transformed to yield other response parameters of interest. De-embedding the scattering matrix $S_{pm}$ for the processed modes may, in principle, be accomplished by first de-embedding and then post-processing the eigenmode scattering matrix S according to:

$$S_{pm}{}^d = (R^{-1})^T e^{\gamma d} S e^{\gamma d} R^T.$$

This approach is suitable if the SI structure is simulated for a single value set of the design variable(s). However, if a de-embedded processed (and, therefore, stable) scattering matrix is to be available for multiple value sets of the design variable(s), response surfaces are preferably created from only few simulations of the SI structure by interpolation, and the scattering matrices for particular value sets of interest are constructed from the corresponding points on the response surfaces. While stable response parameters can readily by interpolated, de-embedding often introduces rapid variations with the design variables: the entries of $S_{pm}{}^d$ may vary much more rapidly with the design variables then the stable entries of $S_{pm}$. Consequently, interpolating the de-embedded matrix may be computationally expensive and result in a partial loss of the benefits of employing interpolation.

In order to retain the advantages of interpolating stable response parameters so as to obtain smooth response surfaces, de-embedding is accomplished, in various embodiments, by interpolating the original stable scattering matrix $S_{pm}$, and then constructing the de-embedded matrix at points of interest. The embedded and original stable scattering matrices are related via:

$$S_{pm}{}^d = R^{-T} e^{\gamma d}(R^T S_{pm} R^{-T}) e^{\gamma d} R^T = (R^{-T} e^{\gamma d} R) S_{pm}(R^{-T} e^{\gamma d} R) = e^{\Gamma d} S_{pm} e^{\Gamma d}.$$

Since the columns of the transformation matrix R are associated with eigenmodes, the matrix R is not always stable as the design variables are changed, rendering interpolation difficult and computationally costly. The "de-embedding matrix" $e^{\Gamma d} = R^{-T} e^{\gamma d} R$, on the other hand, is a block-diagonal matrix whose rows and columns are both associated with stable processed modes, so that the entries of $e^{\Gamma d}$ are stable across design variations. Accordingly, by interpolating the de-embedding matrix $e^{\Gamma d}$, rather than the transformation matrix R, mode-tracking difficulties may be avoided.

The de-embedding matrix $$e^{\Gamma d} = \mathrm{diag}(e^{\Gamma_1 d_1}, e^{\Gamma_2 d_2}, \ldots, e^{\Gamma_N d_N}), \text{ with } e^{\Gamma_k d_k} = R_k^{-T} e^{\gamma_k d_k} R_k^T,$$

is a function of the de-embedding distances $d_1, d_2, \ldots, d_N$ of the N ports. Therefore, its entries may be highly oscillatory functions. Further, the de-embedding distances are not always known a priori. Rather, it is often desirable to de-embed the SI structure for multiple distances. Such flexibility is provided in certain preferred embodiments that involve interpolating the block-diagonal matrix $\Gamma = R^{-T} \gamma R^T$, which is independent of the de-embedding distances, rather than the de-embedding matrix. The matrix $\Gamma$ is a processed matrix of propagation constants, which varies slowly with the design variable(s) and can easily be interpolated. The de-embedding matrix $e^{\Gamma d}$ may then be constructed for de-embedding distances of interest. In some embodiments, constructing the de-embedding matrix exploits the fact that $\Gamma$ and $e^{\Gamma d}$ share the same eigenvectors, and that $\gamma$ and $\Gamma$ share the same eigenvalues.

Figure 4:
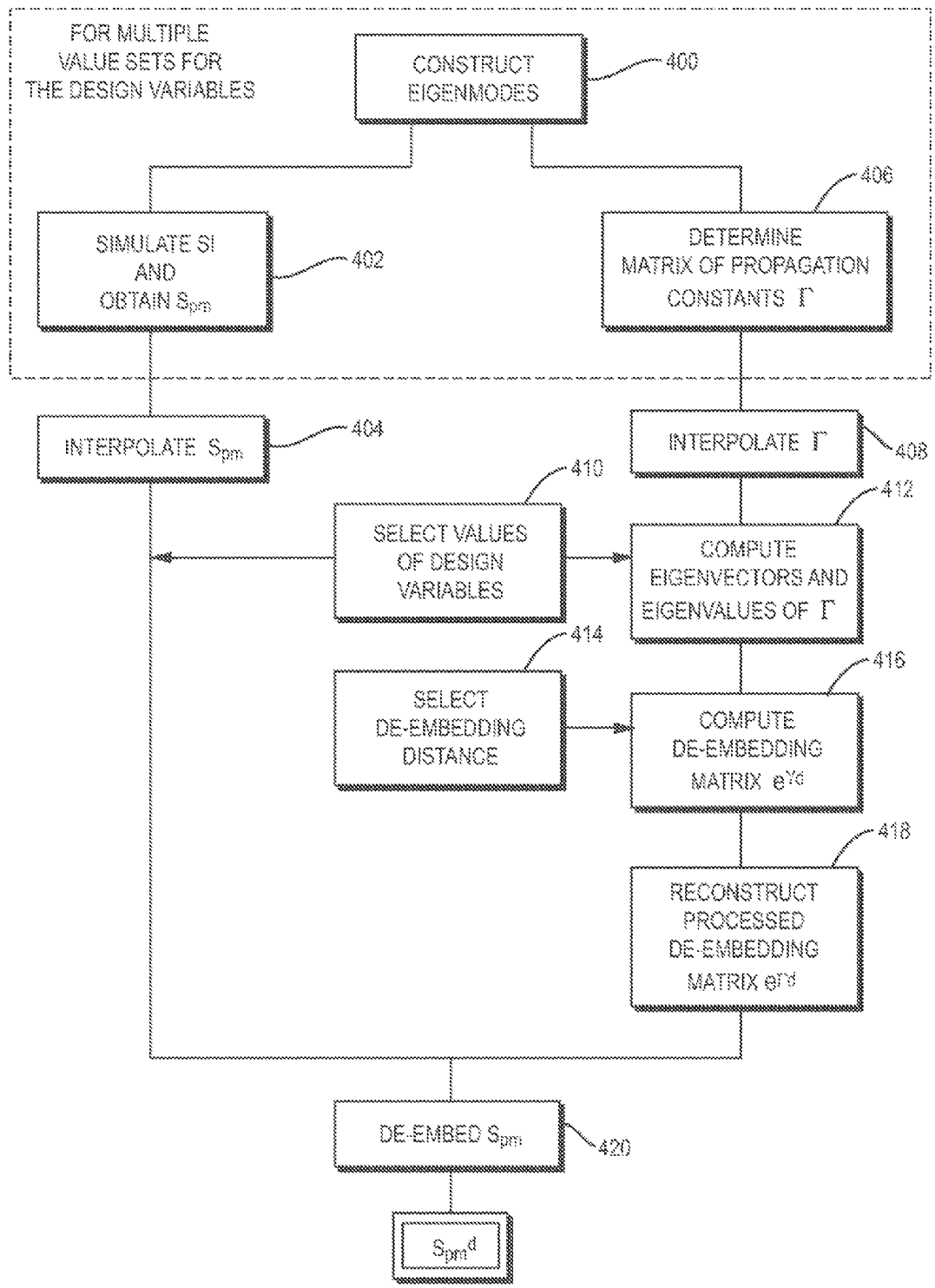
FIG. 4 is a flow chart illustrating a methods for de-embedding a response surface in accordance with one embodiment.

FIG. 4 illustrates an exemplary method for de-embedding response surfaces for the scattering matrix. The method includes constructing eigenmodes (step 400) and simulating the SI structure to obtain a scattering matrix $S_{pm}$ for the stable processed modes (step 402) for multiple sets of values for the design variable(s), as described in more detail above with reference to FIG. 3. In step 404, the stable scattering matrix $S_{pm}$ is interpolated between the simulated points. Further, the propagation constants associated with the eigenmodes, which collectively form the matrix of propagation constants $\gamma$, is transformed to yield a stable processed matrix of propagation constants $\Gamma$ (step 406). This matrix $\Gamma$ is likewise interpolated (step 408). Thus, smooth response surfaces for $S_{pm}$ and $\Gamma$ are obtained.

For each point of interest on the response surface, selected in step 410, the eigenvectors and eigenvalues of the processed matrix of propagation constants $\Gamma$ are determined (step 412). More specifically, an eigen-decomposition is performed on each of the matrix blocks $\Gamma_k$ ($k=1, 2, \ldots, N$) corresponding to the N ports of the SI structure, resulting in eigenvalues $\lambda_k$ and eigenvectors $X_k$:

$$\Gamma_k = X_k \lambda_k X_k^{-1}.$$

where the eigenvalues $\lambda_k$ are the same as the propagation constants associated with the eigenmodes of the SI structure. As a result, multiplying the eigenvalues $\lambda_k$ with the desired de-embedding distances (selected in step 414) and exponentiating (step 416) results in the de-embedding matrix $\gamma$ for the eigenmodes, with $$e^{\gamma_k d_k} = \mathrm{diag}(e^{\lambda_1 d_k}, e^{\lambda_2 d_k}, \ldots, e^{\lambda_M d_k}).$$

The de-embedding matrix $e^{\Gamma d}$ for the processed modes may now be reconstructed from $e^{\gamma d}$ and the eigenvectors $X_k$ (step 418):

$$e^{\Gamma_k d_k} = X_k e^{\gamma_k d_k} X_k^{-1}.$$

Finally, in step 420, the stable scattering matrix $S_{pm}$ may be de-embedded by transformation with the de-embedding matrix:

$$S_{pm}{}^d = e^{\Gamma d} S_{pm} e^{\gamma d}.$$

The de-embedded scattering matrix $S_{pm}{}^d$ may be further processed to obtain, for example, the impedance matrix Z and/or the admittance matrix Y of the SI structure. If $S_{pm}{}^d$ is the de-embedded matched terminal scattering matrix $S_{tm}{}^d$, for example, the impedance matrix Z can be computed according to:

$$Z = Z_0^{1/2}(I + S_{tm}{}^d)(I - S_{tm}{}^d)^{-1} Z_0^{1/2},$$

and the admittance matrix can be obtained from Z by matrix inversion: $Y = Z^{-1}$. Further, if scattering parameters need to be obtained for the non-matched case, the matched terminal scattering matrix $S_{tm}{}^d$ may be renormalized with the reference impedance matrix $Z_{ref}$:

$$S^d{}_r = (I - Z_{ref}^{1/2} Y Z_{ref}^{1/2})(I + Z_{ref}^{1/2} Y Z_{ref}^{1/2})^{-1}.$$

Figure 5:
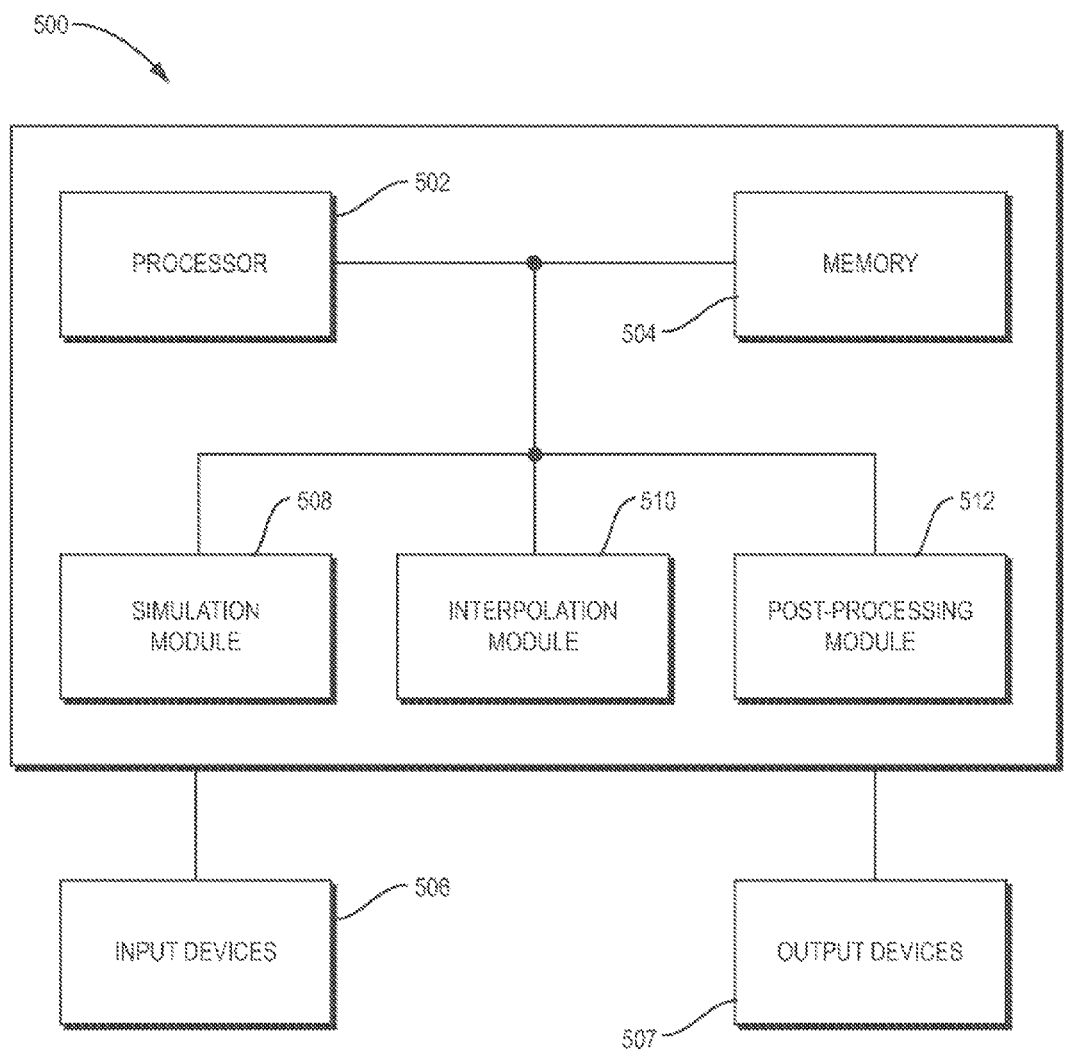
FIG. 5 is a block diagram of a system for simulating SI structures in accordance with one embodiment.

The above-described methods for simulating SI structures may be implemented in a computer system (e.g., on a general-purpose computer furnished with suitable software) or, more generally, with hardware, software, or a combination of both. An exemplary system 500 is illustrated in FIG. 5 in block-diagram form. The system 500 includes a processing unit 502 (e.g., a conventional microprocessor) in communication with memory 504. The memory 504 stores data representative of the signal integrity structure, including fixed and variable design parameters. In various embodiments, a user may initially provide, or later modify, this data via one or more input devices 506. For example, the system may allow the user to specify the values of one or more design variables. The system 500 may also include output devices 507, such as screen displays or printers. An screen display may, for example, render a graphical representation of the SI structure, list response parameters, and/or plot response surfaces. A user may utilize this information to adjust the design variables of the SI structure.

The system 500 further includes various modules in communication with the memory 504 for carrying out the simulation and processing operations described above. A simulation module 508 may be used to simulate the SI structure and to obtain response parameters. The simulation module 508 may also facilitate processing response parameters, e.g., to obtain stable parameters from the eigenmodes scattering matrix, or to renormalize matched response parameters. The same or an additional simulation module may be used to simulate the transmission lines to construct eigenmodes. The response parameters resulting from the simulation may be stored in the memory 504. An interpolation module 510 may retrieve the response parameters or matrices for multiple sets of design variable values from the memory 504, and interpolate them as described above to construct response surfaces. Further, the interpolation module 510 may interpolate the eigenmode propagation constants for subsequent use in de-embedding. A post-procession module 512 may facilitate various post-processing operations, such as de-embedding, renormalization, or conversion to different response parameters in the manner set forth above. The post-processing module 512 may outsource certain steps of the various operations (e.g., the conversion from scattering to impedance parameters, or the interpolation of the eigenmode propagation constants for de-embedding) to the simulation and interpolation modules 508, 510. In addition, the system 500 may include a graphics module (not shown) for generating a visual representation of the simulation results and cause them to be presented on a display 507; for example, the response functions of the SI structure may be represented by different colors whose intensities or hues indicate the magnitudes of the response-function outputs as predicted by the simulation.

In general, the functionality of the system 500 may be distributed between the modules 508, 510, 512 in various ways, and certain operations may be enabled by more than one of the modules. In some embodiments, the modules 508, 510, 512 are software modules which are, in operation, stored in memory 504. The software may be written in any one of a number of high level languages such as C, C++, C#, CUDA, OpenCL, FORTRAN, PASCAL, JAVA, LISP, PERL, BASIC or any suitable programming language. Alternatively, the software may be implemented in an assembly language and/or machine language directed to a microprocessor or specialized high-performance computational hardware, such as a GPU, resident on a target device.

Although the present invention has been described with reference to specific details, it is not intended that such details should be regarded as limitations upon the scope of the invention, except as and to the extent that they are included in the accompanying claims.

What is claimed is:

1. A computer-implemented method of simulating a signal integrity structure excitable via transmission lines, the method comprising the steps of:
    (a) constructing by a processor and storing in memory coupled to the processor, a plurality of stable processed modes for the signal integrity structure, each stable processed mode comprising a linear combination of a plurality of eigenmodes, the construction of each stable processed mode comprising: (i) computation of at least one of a first matrix T and a second matrix U, the first matrix T being computed by integrating electric fields of the eigenmodes over a first path between a corresponding terminal and a reference terminal and the second matrix U being computed by integrating magnetic fields of the eigenmodes over a second path around the corresponding terminal; (ii) computation of a transformation matrix R using at least one of the first matrix T and the second matrix U, and (iii) modifying the eigenmodes using the transformation matrix R to obtain the stable processed mode; and
    (b) computationally simulating by the processor the signal integrity structure using the plurality of stable processed modes.

2. The method of claim 1 wherein the stable processed modes comprise matched terminal modes.

3. The method of claim 2 wherein the matched terminal modes comprise travelling wave power modes.

4. The method of claim 2 wherein the matched terminal modes comprise at least one of current modes or voltage modes.

5. The method of claim 1 wherein constructing the stable processed modes comprises simulating the transmission lines to construct eigenmodes, and computationally processing the eigenmodes to obtain the stable processed modes.

6. The method of claim 1 wherein computationally simulating the signal integrity structure comprises providing an input signal, the simulation returning an output signal based on the input signal.

7. The method of claim 6 wherein providing the input signal comprises computationally exciting a stable processed mode at an interface of the signal integrity structure with the transmission lines.

8. The method of claim 6 further comprising characterizing the signal integrity structure by at least one parameter indicative of a relationship between the input signal and the output signal.

9. The method of claim 8 wherein the at least one parameter comprises at least one of a terminal scattering parameter, a terminal admittance parameter, or a terminal impedance parameter.

10. The method of claim 8 further comprising de-embedding the at least one parameter.

11. The method of claim 8 further comprising renormalizing the at least one parameter.

12. The method of claim 8 further comprising varying at least one design variable of the signal integrity structure and repeating steps (a) and (b) for the varied design variable.

13. The method of claim 12 wherein the at least one design variables comprises at least one of a material property, a geometric variable, or an operating frequency of the signal integrity structure.

14. The method of claim 12 wherein repeating steps (a) and (b) comprises tracking at least some of the stable processed modes while varying the at least one design variable.

15. The method of claim 14 further comprising determining, based at least in part on the tracked stable processed modes, a functional dependence of the at least one parameter on the at least one design variable.

16. The method of claim 15 wherein determining the functional dependence comprises interpolating the at least one parameter between multiple values of the at least one design variable.

17. The method of claim 16, further comprising at least one of de-embedding or renormalizing the at least one parameter subsequent to the interpolation.

18. The method of claim 15 further comprising graphically representing the functional dependence on a display device.

19. The method of claim 8 further comprising graphically representing the at least one parameter.

20. The method of claim 1 wherein at least one of steps (a) and (b) is based at least in part on a finite element method.

21. A computer-implemented method of characterizing the physical behavior of a signal integrity structure excitable via transmission lines and interfacing with the transmission lines at a plurality of ports, the method comprising:
(a) for each of a plurality of values of a design variable of the signal integrity structure, the values being received in memory coupled to a processor: (i) computationally exciting by the processor a plurality of incoming eigenmodes as input signals at the ports, the computational excitation of the plurality of incoming eigenmodes comprising: (i) computation of at least one of a first matrix T and a second matrix U, the first matrix T being computed by integrating electric fields of the eigenmodes over a first path between a corresponding terminal and a reference terminal, and the second matrix U being computed by integrating magnetic fields of the eigenmodes over a second path around the corresponding terminal; (ii) computation of a transformation matrix R using at least one of the first matrix T and the second matrix U, and (iii) modifying the eigenmodes using the transformation matrix R to obtain the plurality of incoming eigenmodes (ii) computationally simulating by the processor the signal integrity structure to determine a plurality of outgoing modes as output signals at the ports, and (iii) computationally determining by the processor at least one stable parameter based on the input signals that are the incoming eigenmodes and the output signals that are the outgoing modes, the at least one stable parameter comprising a parameter that is: (i) based on the input signals and output signals, and (ii) post processed according to a transformation matrix; and
(b) interpolating the at least one stable parameter between different values of the design variable to determine a functional dependence of the at least one stable parameter on the design variable, thereby characterizing the behavior of the signal integrity structure in terms of input and output, wherein the at least one stable parameter is tracked between the different values of the design variable.

22. The method of claim 21 wherein the incoming eigenmodes comprise matched terminal modes.

23. The method of claim 22 wherein the incoming eigenmodes comprise at least one of travelling wave modes, current modes, or voltage modes.

24. The method of claim 21 wherein determining the at least one stable parameter comprises determining first parameters indicative of a relationship between the input and output signals, and processing the first parameters to obtain the stable parameters.

25. The method of claim 21 wherein the at least one stable parameter is a terminal parameter.

26. The method of claim 21 further comprising:
(c) post-processing the at least one interpolated stable parameter for user-selected values of the design variable.

27. The method of claim 26 wherein post-processing comprises at least one of deembedding or renormalizing the at least one interpolated stable parameter.

28. A system for simulating a signal integrity structure excitable via transmission lines, comprising:

(a) a memory for storing data representative of the signal integrity structure and the transmission lines; and
(b) at least one simulation module, in communication with the memory, for simulating the transmission lines to construct a plurality of stable processed modes and for simulating the signal integrity structure using the plurality of stable processed modes, each stable processed mode comprising a linear combination of a plurality of eigenmodes, the construction of each stable processed mode comprising: (i) computation of at least one of a first matrix T and a second matrix U, the first matrix T being computed by integrating electric fields of the eigenmodes over a first path between a corresponding terminal and a reference terminal, and the second matrix U being computed by integrating magnetic fields of the eigenmodes over a second path around the corresponding terminal; (ii) computation of a transformation matrix R using at least one of the first matrix T and the second matrix U, and (iii) modifying the eigenmodes using the transformation matrix R to obtain the stable processed mode.

29. A system for characterizing the physical behavior of a signal integrity structure excitable via transmission lines, comprising:
(a) a memory for storing data representative of the signal integrity structure for a plurality of values of a design variable of the signal integrity structure;
(b) a simulation module, in communication with the memory, for simulating the signal integrity structure and to determine at least one stable parameter based on the simulation, the at least one stable parameter comprising a parameter based on stable processed modes, each stable processed mode comprising a linear combination of a plurality of eigenmodes, the linear combination being computed using a transformation matrix R, or a parameter based on eigenmodes that is post processed according to a transformation matrix the transformation matrix R being generated by computing at least one of a first matrix T and a second matrix U, the first matrix T being computed by integrating electric fields of the eigenmodes over a first path between a corresponding terminal and a reference terminal, and the second matrix U being computed by integrating magnetic fields of the eigenmodes over a second path around the corresponding terminal; and
(c) an interpolation module, in communication with the memory, for interpolating the at least one stable parameter between different values of the design variable to determine a functional dependence of the at least one stable parameter on the design variable, whereby the behavior of the signal integrity structure is characterized in terms of input and output.

30. The system of claim 29, wherein the simulation uses stable processed modes.

31. The system of claim 29, further comprising a post-processing module, in communication with the memory, for at least one of de-embedding or renormalizing the at least one interpolated stable parameter.

32. A computer-implemented method for de-embedding a response surface of a signal integrity structure, the method comprising:
(a) obtaining the response surface by computationally simulating by a processor the signal integrity structure for a plurality of values of at least one design variable, the values being received in a memory coupled to the processor, and computationally interpolating by the processor at least one stable response parameter resulting from the simulation, between the plurality of values, the at least one stable parameter comprising a parameter based on stable processed modes, each stable processed mode comprising a linear combination of a plurality of eigenmodes, the linear combination being computed using a transformation matrix R, or a parameter based on eigenmodes that is post processed according to a transformation matrix the transformation matrix R being generated by computing at least one of a first matrix T and a second matrix U, the first matrix T being computed by integrating electric fields of the eigenmodes over a first path between a corresponding terminal and a reference terminal, and the second matrix U being computed by integrating magnetic fields of the eigenmodes over a second path around the corresponding terminal;

(b) computationally interpolating by the processor a processed matrix of propagation constants associated with eigenmodes of the signal integrity structure; and (c) for each of multiple user-selected values of the at least one design variable,
  (1) constructing by the processor a de-embedding matrix from (i) at least one desired deembedding distance and (ii) the processed matrix of propagation constants corresponding to the user-selected value, and
  (2) de-embedding by the processor the response surface using the de-embedding matrix.

33. The method of claim 32, wherein the de-embedding distance corresponds to a length by which an external transmission line interfacing with the signal integrity structure is extended.

34. The method of claim 32, wherein the de-embedding matrix is constructed based, at least in part, on eigenvectors and eigenvalues of the processed matrix of propagation constants.

35. A system for de-embedding a response surface of a signal integrity structure excitable via transmission lines, the system comprising:

(a) a memory for storing data representative of the response surface and propagation constants associated with eigenmodes of the transmission lines, the response surface representing a dependence of a stable response parameter on a design variable within a range of values thereof, the stable parameter comprising a parameter based on stable processed modes, each stable processed mode comprising a linear combination of a plurality of eigenmodes, the linear combination being computed using a transformation matrix R, the transformation matrix R being generated by computing at least a first matrix T and a second matrix U, the first matrix T being computed by integrating electric fields of the eigenmodes over a first path between a corresponding terminal and a reference terminal, and the second matrix being computed by integrating magnetic fields of the eigenmodes over a second path around the corresponding terminal;

(b) an interpolation module for interpolating a processed matrix of the propagation constants; and (c) a de-embedding module that facilitates, for any user-selected value of the design variable within the range of values, de-embedding the response surface by
  (1) constructing a de-embedding matrix from (i) at least one user-specified de-embedding distance and (ii) the processed matrix of propagation constants corresponding to the user-selected value, and
  (2) de-embedding the response surface using the de-embedding matrix.

* * * * *